(12) United States Patent
Al-Buaijan

(10) Patent No.: US 8,474,301 B2
(45) Date of Patent: Jul. 2, 2013

(54) SHUT-OFF VALVE TESTING SYSTEM

(76) Inventor: Tareq Nasser Al-Buaijan, Yarmok (KW)

( * ) Notice: Subject to any disclaimer, the term of this patent is extended or adjusted under 35 U.S.C. 154(b) by 0 days.

(21) Appl. No.: 13/585,208

(22) Filed: Aug. 14, 2012

(65) Prior Publication Data

US 2013/0119285 A1 May 16, 2013

Related U.S. Application Data

(63) Continuation of application No. 13/295,962, filed on Nov. 14, 2011.

(51) Int. Cl.
*G01L 27/00* (2006.01)

(52) U.S. Cl.
USPC .......................................................... 73/1.72

(58) Field of Classification Search
USPC .......................................................... 73/1.72
See application file for complete search history.

(56) References Cited

U.S. PATENT DOCUMENTS

| | | | | |
|---|---|---|---|---|
| 5,992,819 | A * | 11/1999 | Asskildt et al. | 251/63.6 |
| 6,578,425 | B2 * | 6/2003 | Hickman | 73/716 |
| 2009/0222233 | A1 * | 9/2009 | Al-Buaijan | 702/114 |

OTHER PUBLICATIONS

Prior art in U.S. Appl. No. 13/295,962, filed Nov. 14, 2011, the priority of which is claimed herein.

* cited by examiner

*Primary Examiner* — Hezron E Williams
*Assistant Examiner* — Paul West
(74) *Attorney, Agent, or Firm* — Richard C. Litman

(57) ABSTRACT

The shut-off valve testing system provides for the testing of the main shut-off valve of a combustible gas supply line in such facilities as refineries, factories, or other plants utilizing such gaseous fuel. The system includes a double-ended hydraulic cylinder receiving hydraulic pressure from a suitable source, the cylinder communicating hydraulically with a hydraulic actuator for the main shut-off valve. The system provides for testing of the shut-off valve by actuating the valve through a portion of its full travel, thus confirming that the valve is free. This is accomplished by shutting off the pressure to one side of the double-ended hydraulic cylinder, and opening the hydraulic line between the cylinder and the actuator. Thus, hydraulic pressure from the actuator can bleed to the cylinder, allowing the actuator to move to the extent of the limiting spring and/or hydraulic pressure to the opposite side of the cylinder.

17 Claims, 4 Drawing Sheets

SHUT-OFF VALVE TESTING SYSTEM

CROSS-REFERENCE TO RELATED APPLICATIONS

This is a continuation of my prior application Ser. No. 13/295,962, filed Nov. 14, 2011 now pending.

BACKGROUND OF THE INVENTION

1. Field of the Invention

The present invention relates generally to control valve systems, and particularly to a shut-off valve testing system for testing and operating the main shutdown valve that controls gas flow in a refinery, industrial plant or other facility.

2. Description of the Related Art

In the oil, gas, petroleum and power industries, natural gas or other combustible gas is often used to provide the required heat or combustion motive power for many operations in a processing refinery, plant, or other industrial facility. Various conditions may occur that necessitate immediate shut down of the operations of the facility. In those facilities, a majority of the final control elements of a shutdown system are implemented with fast acting shut-off valves. In such industries, a majority of the shut-off valves remain open while the operation is operating safely in a nominal controlled state. Such shut-off valves are closed only upon actuation of the shutdown system of the facility, arising from an out-of-control process or during a normal maintenance outage.

In practice, the testing of emergency shut-off valves is normally done during shut down of the facility operation. However, there is a tendency for such valves to stick or freeze due to corrosion or other reasons, which may lead to an unsafe condition where the valve cannot be closed during an emergency shutdown. This problem is exacerbated by economic conditions in the operation of the facility that have lead to a reduction in the frequency of valve shut-offs for maintenance or testing purposes. For example, some operations may run continuously for one or more years without shutting down the operation for maintenance.

State of the art emergency shut-off systems that control the shut-off valves have a number of features to detect system failures, and typically include redundancies for added reliability. However, such systems may not provide for the testing of a shut-off valve, other than by operating the valve through its normal stroke or travel. The problem is that operating the valve through its full stroke or travel, i.e., completely closing the valve, causes an undesirable disruption in the operation of the facility.

Thus, a shut-off valve testing system solving the aforementioned problems is desired.

SUMMARY OF THE INVENTION

The shut-off valve testing system uses a system of valves and other components for controlling the main shut-off valve installed in the combustible gas or fuel supply line in an industrial plant or facility. The testing system includes a double-ended hydraulic cylinder having one side or end that receives hydraulic pressure from an appropriate source to regulate the system at times during the testing of the system. The opposite side or end of the cylinder communicates hydraulically with and regulates the travel or stroke of the hydraulic actuator during testing. The actuator, in turn, operates the main shut-off valve. Hydraulic pressure to both sides of the actuator for the main shut-off valve is provided from a pressurized source of hydraulic fluid, which may be the same source as the hydraulic fluid provided to the double-ended cylinder. Some of the fluid is routed through one side of the actuator to the hydraulic cylinder during some portions of the operation.

The hydraulic cylinder is closed relative to the actuator during normal operations, i.e., with the main shut-off valve open to allow gas flow through the gas delivery line. Partial Instrument Trip Testing (PITT) of the main shut-off valve by operating the valve through its partial stroke or travel is accomplished by relieving hydraulic pressure from one side of the actuator by opening a valve between the actuator and the cylinder. This allows the actuator to relieve hydraulic pressure to the cylinder to allow the actuator to move, thereby moving the shut-off valve through at least a portion of its full travel. Full travel of the shut-off valve (i.e., shut down of the system) is prevented by a differential pressure transmitter across the two portions or volumes of the hydraulic cylinder. The differential pressure transmitter provides a signal to the control system to reverse the positions of the various control valves before complete closure of the main shut-off valve occurs. As the operation of the shut-off valve requires some finite amount of time, partial travel of the valve may be determined, alternatively, by actuating the valve for a time period less than that required for full travel or shutoff.

When a complete shutoff of the fuel supply is demanded due to an emergency or other requirement in the plant or facility, the hydraulic actuator is cycled to its full travel to cause the shut-off valve to close completely. The double-ended hydraulic cylinder is not a factor during complete shutdown operations, as hydraulic pressure is shut off to the hydraulic cylinder. However, other valves are actuated that result in hydraulic pressure being relieved in one side of the actuator, thereby causing the actuator piston to move to actuate the shut-off valve through its complete stroke or travel to completely shut off gas flow through the line.

The system further includes a control system for limiting the complete travel of the main shut-off valve during testing of the device, and for actuating the system in the event of an emergency requiring complete shutoff of flow through the combustible gas line controlled by the main shut-off valve. The control system is computerized for automatic operation, depending upon input from various conventional sensors of the fuel and valve control system. However, the system also provides for manual control when desired.

These and other features of the present invention will become readily apparent upon further review of the following specification and drawings.

DETAILED DESCRIPTION OF THE PREFERRED EMBODIMENTS

The shut-off valve testing system provides for the partial instrument trip testing (PITT) of a main shut-off valve in a combustive gas main fuel supply line as often installed to provide heat and combustive power for equipment found in refineries, factories, and similar industrial facilities. The system allows the main shut-off valve to be cycled through only a portion of its full travel or stroke, thus confirming that the valve is not stuck while also allowing the valve to remain at least partially open to avoid disrupting the gaseous fuel supply for the operation of the facility.

Figure 1:
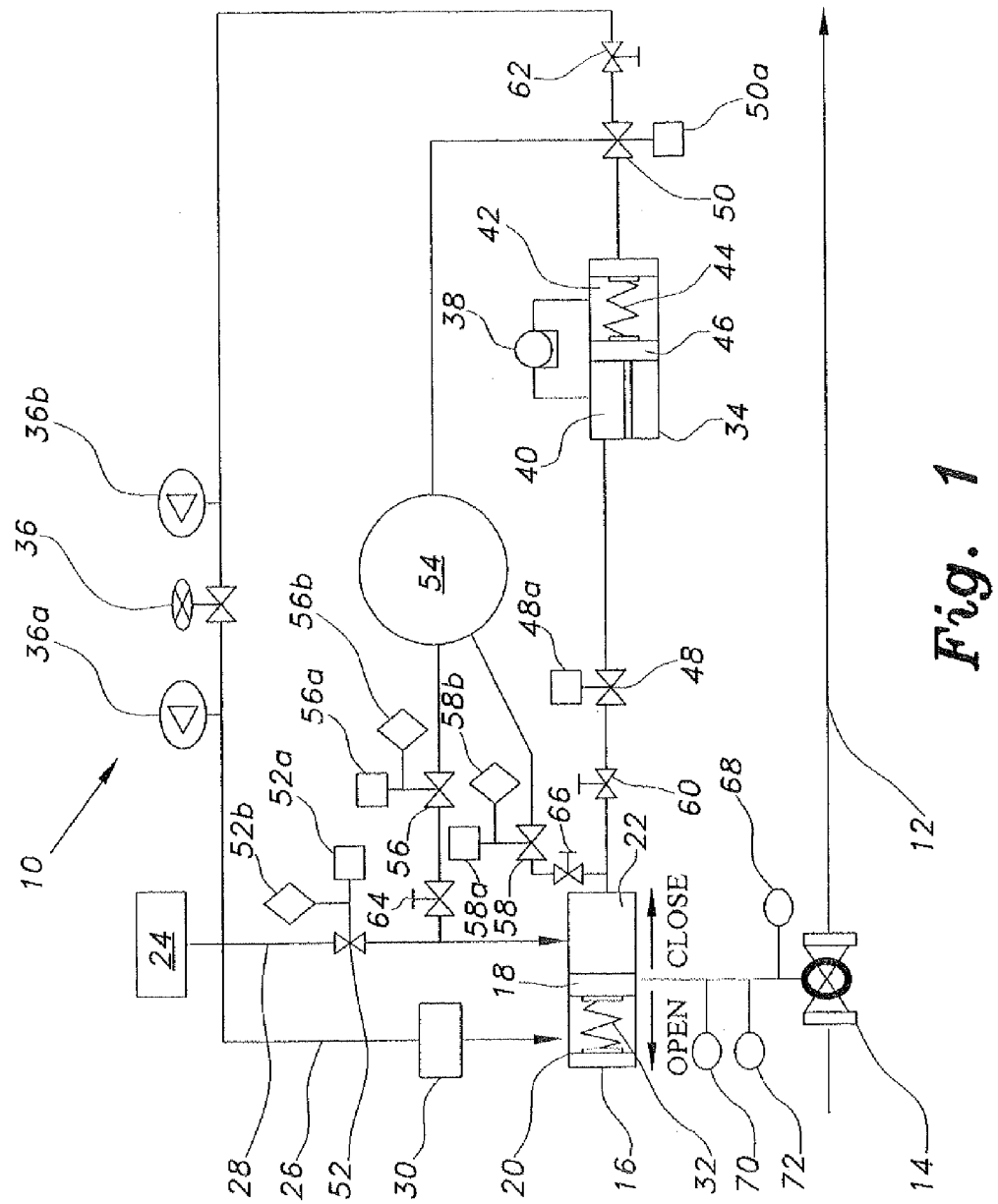
FIG. 1 is a schematic diagram of a shut-off valve testing system according to the present invention, illustrating its general features.

FIG. 1 of the drawings is a schematic diagram of an exemplary shut-off valve testing system 10 according to the present invention, as it would be installed with a gaseous fuel supply line 12 and the main shut-off valve 14 installed in series in the line 12. The main shut-off valve 14 is mechanically linked to a hydraulically operated actuator 16. The actuator 16 has an internal piston 18 that separates the internal volume into a loading pressure side 20 and an opposite actuating pressure side 22. The actuator 16 receives hydraulic pressure from a conventional hydraulic pressure source 24. A loading pressure hydraulic line 26 extends from the pressure source 24 to the loading pressure side 20 of the actuator 16, and an actuating pressure hydraulic line 28 extends from the pressure source 24 to the actuating pressure side 22 of the actuator 16.

The loading pressure hydraulic line 26 may include a pressure regulator or reducer 30 to lower the pressure in the loading pressure side 20 of the actuator 16 to a level somewhat less than the opposite actuating pressure side 22. This assures that the actuator 16 will remain in its normal operating condition, i.e., holding the main shut-off valve 14 open, so long as a higher hydraulic pressure is applied to the actuating pressure side 22 of the actuator 16. The actuator 16 may also contain an internal mechanical spring 32 in the loading pressure side or volume 20 to assure positive shut-down in the event that all hydraulic pressure is lost.

The actuating pressure side 22 of the actuator 16 is connected hydraulically to the actuator side or volume of a combination hydraulic-hydraulic control cylinder 34. Hydraulic pressure is supplied to the opposite return side or volume of the control cylinder 34 from the source of hydraulic pressure 24 used to supply the actuator 16, as shown in FIG. 1, or other hydraulic pressure source, as desired. The hydraulic line extending from the source of hydraulic pressure 24 to the spring-loaded return side or volume of the hydraulic-hydraulic cylinder 34 preferably includes a regulator 36 and first and second pressure gauges or transmitters 36a and 36b to measure unregulated and regulated hydraulic pressure on each side of the regulator 36.

A differential pressure transmitter 38 is connected across the control cylinder 34, and communicates with the actuator side or volume 40 and the return side or volume 42 of the control cylinder 34 to provide information about the differential pressure across the control cylinder 34 to a control facility, discussed further below. An internal spring 44 is provided in the return volume side 42 of the hydraulic-hydraulic control cylinder 34 to bear against the piston 46 separating the two internal volumes 40 and 42 to assure proper operation in the event that return side hydraulic pressure is lost. The total volume of the two sides 40 and 42 of the control cylinder 34 is somewhat less than the total internal volumes of the two sides 20 and 22 of the actuator 16 to assure that the actuator 16 cannot travel to its limits during test actuation by the control cylinder 34, thus limiting the main shut-off valve 14 to partial travel or stroke.

The shut-off valve testing system 10 includes a number of additional control valves that control hydraulic flow through the system. A first hydraulic control valve 48 is installed in the hydraulic line between the actuating pressure side or volume 22 of the actuator 16 and the actuator side or volume 40 of the control cylinder 34. This first hydraulic control valve 48 is normally closed, opening only during the partial stroke or travel testing (PITT) of the main shut-off valve 14 by the actuator 16, as explained further below. The first hydraulic control valve 48 is operated by a solenoid 48a. The first hydraulic valve 48 is preferably normally closed, requiring no electrical power for it to remain closed. Electrical power to the solenoid 48a is only required to open the valve 48 during the brief time of testing the main shut-off valve 14, thus assuring that this valve 48 will remain in the desired closed condition in the event of loss of electrical power. However, this valve 48 may also be reconfigured to require electrical power to hold it in its closed condition so that electrical power is removed to open the valve 48, if desired.

A second hydraulic valve 50, comprising a three-way valve, is disposed in the hydraulic pressure line between the source of hydraulic pressure 24 and the return side or volume 42 of the hydraulic-hydraulic control cylinder 34, and serves to control hydraulic pressure to the return side 42 of the control cylinder 34. This three-way hydraulic valve 50 is normally closed between the hydraulic pressure source 24 and the control cylinder 34, except during the brief time that the actuator 16 is being returned to its normally open condition to reopen the main shut-off valve 14 fully after testing, as explained in detail further below. The third port in this three-way hydraulic valve 50 comprises a vent or relief line extending from the valve 48 back to a hydraulic reservoir 54 in FIG. 1. As in the case of the first hydraulic control valve 48, the valve 50 is preferably a solenoid operated electromechanical unit, the solenoid being indicated as component 50a of the valve 50. This valve 50 preferably has a normally closed configuration, i.e., electrical power to the solenoid 50a is only required during the brief times that the valve 50 is open at the end of testing the main shut-off valve 14. This is a safety factor to assure that this hydraulic valve 50 will remain in its desired state in the event that electrical power is lost. However, it will be seen that this hydraulic valve 50 may be configured to require electrical power during its normally closed state and opening only when power is removed, if desired.

A third hydraulic control valve 52 is disposed in the actuating pressure hydraulic line 28 between the hydraulic pressure source 24 and the actuating pressure side or volume 22 of the actuator 16. This third hydraulic valve 52 is also operated by a solenoid 52a, and is also normally closed when no electrical power is supplied to its solenoid 52a. However, electrical power is normally provided to this solenoid 52a to hold this valve 52 in an open condition, to provide hydraulic pressure to the actuating pressure side or volume 22 of the actuator 16. This third valve 52 only closes when the actuator 16 is being cycled to close the main shut-off valve 14, either partially during testing or completely during a shutdown event. The preferred state of this valve 52 is to require electrical power to hold it open, i.e., for normal operations. Thus, it will close if electrical power is lost, resulting in cycling of the actuator 16 and closure of the main shut-off valve 14. As in the cases of the pneumatic control valve 48 and the first hydraulic control valve 50, the third valve 52 may be reconfigured to require electrical power for closure, but the preferred configuration wherein the valve 52 closes when electrical power is lost is a safer configuration.

A hydraulic fluid reservoir 54 is provided in the system and communicates hydraulically with the actuating pressure side or volume 22 of the actuator 16. This reservoir 54 may comprise a hydraulic fluid supply tank for the hydraulic pressure source 24, and would be connected conventionally to the pressure source 24 by a hydraulic line or passage (not shown). A fourth hydraulic control valve 56 is installed in the hydraulic line between the actuating pressure hydraulic line 28 and the hydraulic reservoir 54, and an essentially identical fifth hydraulic control valve 58 is installed in the hydraulic line between the line connecting the actuating side or volume 22 of the actuator 16 and the actuator side or volume 40 of the control cylinder 34. It will be seen that since there are no intervening components to affect the hydraulic pressure or flow between the fourth and fifth hydraulic control valves 56 and 58 and the components to which they attach, i.e., they both communicate hydraulically directly with the actuating pressure side or volume 22 of the actuator 16, that either or both of these valves 56 and 58 may function to relieve pressure in the actuating pressure hydraulic line 28 and the actuating pressure side or volume 22 of the actuator 16. This redundancy provides greater reliability for the emergency shutdown functions of the system.

The fourth and fifth hydraulic control valves 56 and 58 are also electromechanically actuated by their respective solenoids 56a and 58a, as in the cases of the other solenoid-operated valves 48, 50, and 52. The fourth and fifth valves 56 and 58 are closed during all normal operations of the system, including partial stroke testing of the main shutoff valve 14. The valves 56 and 58 are preferably configured to be normally open when no power is received, and are held in their closed states or conditions by power applied through their respective solenoids 56a and 58a. These two valves 56 and 58 are only opened to relieve hydraulic pressure to the actuating side or volume 22 of the actuator 16 when a "trip" or emergency shutdown of the system occurs. When this occurs, electrical power is terminated to the two solenoids 56a and 58a, allowing their valves 56 and 58 to open to release hydraulic pressure in the actuating portion of the system. It will be seen that these two valves 56 and 58 may be reconfigured to require electrical power to open, but it is preferred that they open when electrical power is terminated due to the additional safety factor provided by the likelihood that electrical power will be cut off in an emergency shutdown.

As the third, fourth, and fifth hydraulic control solenoid valves 52, 56, and 58 are cycled during any emergency shutdown of the system, i.e., the complete closure of the main shut-off valve 14, additional means may be provided for the operation of these three valves 52, 56, and 58 to return the system to normal operation in the event that electrical power has not been restored by the operating system for the valves. Accordingly, each of the valves 52, 56, and 58 includes a manual reset "latch," shown as components 52b, 56b, and 58b, allowing an operator(s) to close the valves 56 and 58 and reopen the valve 52 manually to restart the system in order to reopen the main shut-off valve 14.

A number of additional manual valves are also provided in the system to remove hydraulic pressure and flow to various components for maintenance. A first manual valve 60 is installed in the hydraulic line between the actuating pressure side 22 of the actuator 16 and the first hydraulic control valve 50. This valve 60 allows the first hydraulic valve 50 to be removed from the system for maintenance or replacement as required without affecting the emergency shutdown capability of the system. A second manual valve 62 is installed in the hydraulic line between the hydraulic pressure source 24 and the return side or volume 42 of the hydraulic-hydraulic control cylinder 34. This second manual valve 62 permits hydraulic pressure and flow to be cut off to the second hydraulic control valve 50 for maintenance or replacement. A third manual valve 64 is provided in the hydraulic line between the actuating pressure hydraulic line 28 and the fourth hydraulic control valve 56, and a fourth manual valve 66 is installed in the hydraulic line extending from the line between the actuating pressure side or volume 22 of the actuator 16 and the first hydraulic valve 48. Either the third or the fourth manual valve 64 or 66 may be closed to allow the respective hydraulic control valve 56 or 58 to be removed from the system for maintenance or replacement, as required. As the two control valves 56 and 58 are redundant to one another, the operational retention of a single one of the valves 56 or 58 in the system still allows the emergency shutdown function of the system to perform as required in the event that it is needed, even if one of the two valves 56 or 58 is inoperative or removed.

Additional components are provided in the mechanical linkage that connects the actuator 16 to the main shut-off valve 14. These components serve to indicate the position of the shut-off valve 14 during its operation. Main shut-off valve opening and closure limit switches, respectively 68 and 70, serve to detect the respective fully opened and fully closed positions or states of the main shut-off valve 14 and to transmit those states to the control system. A third limit switch 72 serves to detect a predetermined partially open position or state for the main shut-off valve 14 during shut-off valve testing, and to transmit that data to the control system in order that the control system will stop the actuator 16 at that point to avoid excessive closure of the main shut-off valve 14 and subsequent reduction in gas flow through the line 12.

Figure 5:
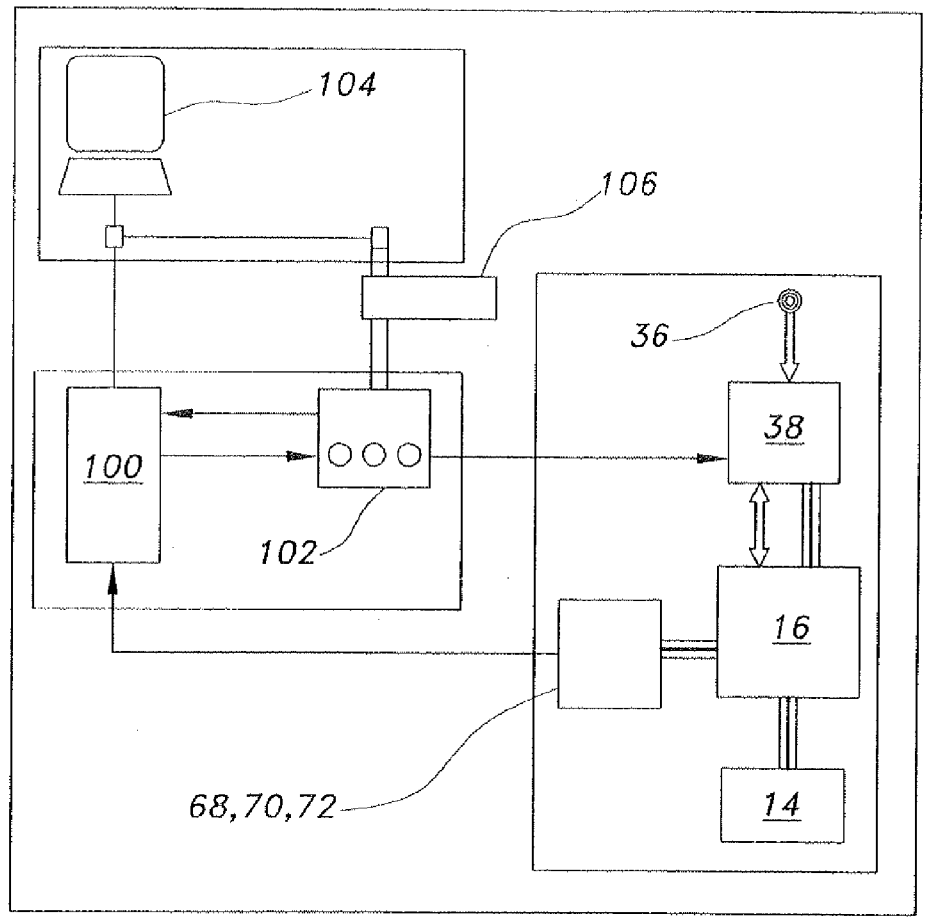
FIG. 5 is a schematic diagram of the major components of the control system for the shut-off valve testing system according to the present invention.

FIG. 5 provides a schematic view of the control system for the hydraulic-pneumatic valve testing system 10 of FIG. 1. The area to the lower right in FIG. 5 indicates in a general manner some of the various components illustrated schematically in FIG. 1 and described further above, i.e., the main shut-off valve 14, its actuator 16, the differential pressure transmitter or transducer 38 of the hydraulic-pneumatic control cylinder (not shown in FIG. 5), and a single block representing the three limit switches 68, 70, and 72 of the connection between the main shut-off valve 14 and the actuator 16. This system is controlled by a computerized control system 100, comprising an emergency shutdown system (ESD) control center 102 that drives a series of transducers 102. The transducers 102 interface with the differential pressure transmitter or transducer 38 across the two ends or volumes of the hydraulic-hydraulic cylinder 34 of FIG. 1. The ESD control center 102 normally carries out the operation of the hydraulic-hydraulic valve system of FIG. 1, particularly for emergency shutdown operations. However, a computer and monitor 104 are provided to enable the human operator to command the ESD control center 102, as may be required from time to time. The computer 104 may be hardwired to the ESD controller 102, but may bypass the ESD controller to control and receive information from the transducers 102 via a remote communication interface 106, if desired.

Figure 2:
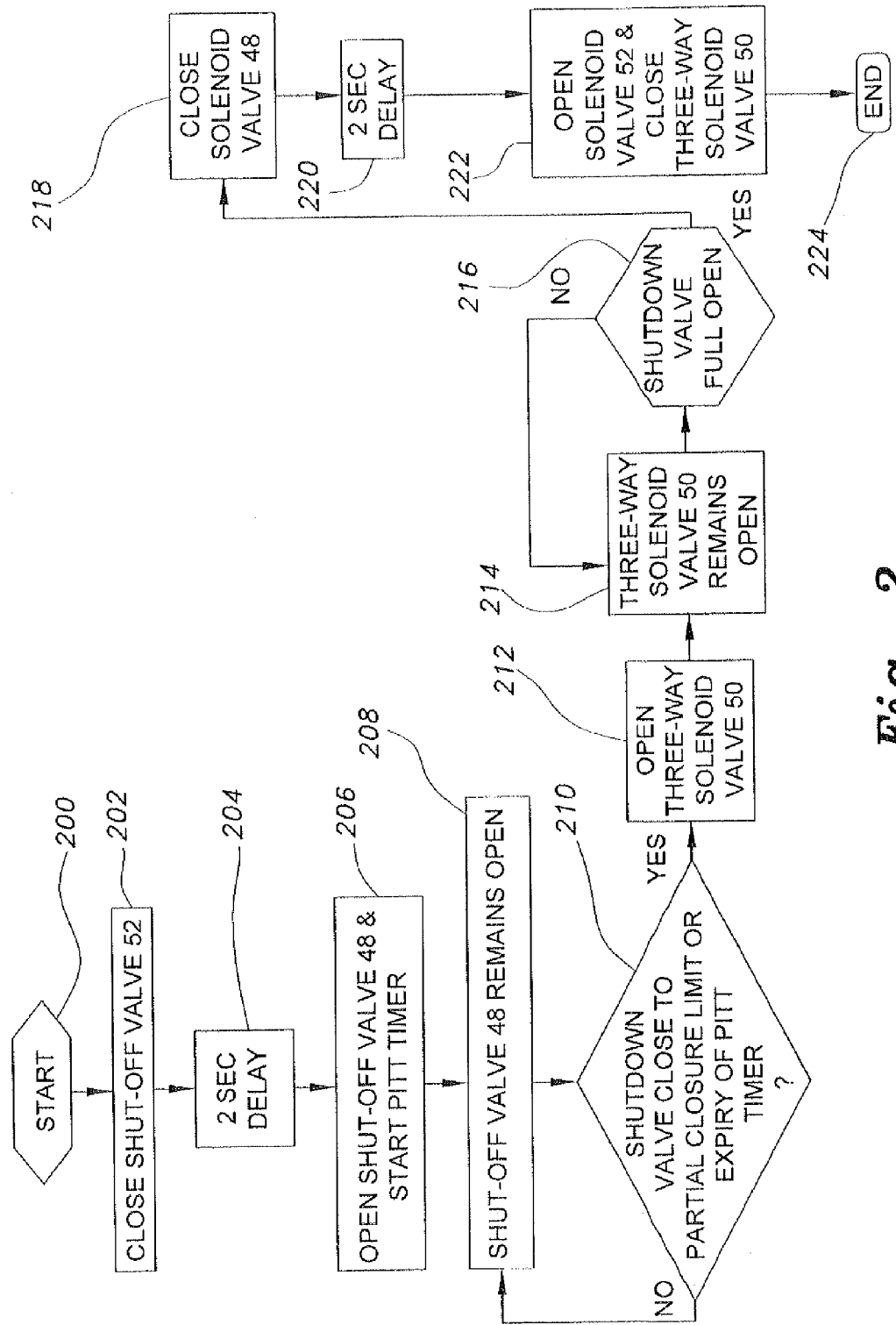
FIG. 2 is a flowchart briefly listing the steps involved in the partial stroke testing of a shutdown valve in the shut-off valve testing system according to the present invention.

FIG. 2 of the drawings is a flowchart describing the basic steps in the Partial Instrument Trip Testing (PITT) of the main shut-off valve 14 of FIG. 1. Start position 200 represents the normal operational status of the system 10, i.e., the main shut-off valve 14 is in its normal, fully opened state to allow gaseous fuel to flow therethrough. When the test is initiated, the third solenoid valve 52 installed in the actuating pressure hydraulic line 28 (FIG. 1) is de-energized to allow the valve 52 to close, generally as indicated in the second step 202 of FIG. 2. At this point the system pauses for a two second delay (more or less, depending upon programming) in order to confirm that the valve 52 is completely closed and will not allow any residual hydraulic fluid under pressure to continue to flow for a short period of time as the remainder of the sequence operates. This delay step is indicated as step 204 in FIG. 2.

After the delay has been completed, the first hydraulic shut-off valve 48 installed in the hydraulic line between the actuator 16 and the actuator side or volume 40 of the hydraulic-hydraulic cylinder 34 is actuated, i.e., opened, as indicated by step 206 of the flow chart of FIG. 2. This allows hydraulic pressure to flow from the actuating pressure side 22 of the actuator 16 to the actuator side 40 of the hydraulic-hydraulic cylinder 34, where the increase in hydraulic pressure is limited by the return side of the cylinder 34. The corresponding hydraulic flow from the actuating pressure side 22 of the actuator 16 allows its piston 18 to move, thereby mechanically moving the main shut-off valve 14 to a partially closed position. The Partial Instrument Trip Testing (PITT) timer of the control system of FIG. 5 may also be initiated at this point, if travel of the main shut-off valve 14 is to be determined by time rather than by position as determined by the partial stroke limit switch 70 of FIG. 1.

The shut-off valve 48 remains energized (open) as indicated by step 208 in FIG. 5 until either the main shutdown valve 14 reaches a point close to its partial stroke limit as measured by the partial stroke limit switch 72 or until the timer expires, as indicated by step 210 of FIG. 5. If neither of these conditions occurs, the shut-off valve 48 remains open. However, with normal main shut-off valve operation it will reach its predetermined partial closure limit before the time limit expires, and the system will then energize (open) the three-way hydraulic solenoid valve 50, as indicated by step 212 of FIG. 5.

The opening of the three-way solenoid valve 50 allows hydraulic fluid to flow under pressure from the source 24 (FIG. 1) into the return side or volume 42 of the hydraulic-hydraulic cylinder 34. This increase in hydraulic pressure drives the piston 46 toward the actuator side 40 of the cylinder, thereby pushing hydraulic fluid back into the actuating pressure side or volume 22 of the actuator 16. This causes the actuator piston 18 to move in a direction to reopen the main shut-off valve 14. This condition continues until the main shutdown or shut-off valve 14 (FIG. 1) has completely reopened, as indicated by step 216 of FIG. 2.

Once the main shut-off valve 14 has reopened completely, the first hydraulic shut-off valve 48 is closed, as indicated by step 218 of FIG. 2. This prevents hydraulic pressure from flowing from the actuating pressure side or volume 22 of the actuator 16 to the actuator side or volume 40 of the hydraulic-hydraulic cylinder 34, once the system has returned to normal. Another two-second delay (or other time period as determined) is initiated immediately after closure of the valve 48 before the operation of any other valves in order to be certain that the valve 48 is completely closed, as indicated by step 220 of FIG. 2.

When the time delay has elapsed and solenoid valve 48 is completely closed, the third solenoid valve 52 is reopened to allow hydraulic pressure to the actuating pressure side 22 of the actuator 16, to assure that the main shut-off valve 14 is held open. At the same time, the three-way hydraulic solenoid valve 50 is closed, with the closure of the hydraulic solenoid valve 48 and three-way solenoid valve 50 locking the hydraulic-pneumatic cylinder out of the system until the next operational check, as indicated by the final steps 222 and 224 of FIG. 2.

Figure 3:
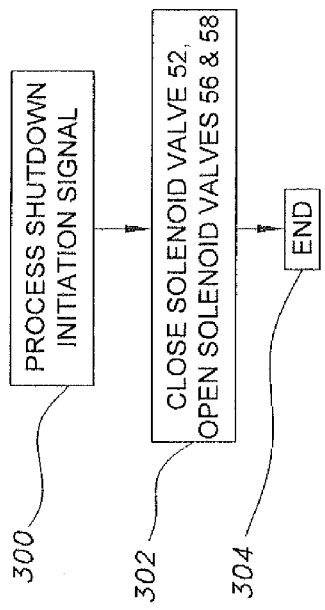
FIG. 3 is a flowchart describing the steps involved in operating various valves in the shutdown process of the shut-off valve testing system according to the present invention.
Figure 4:
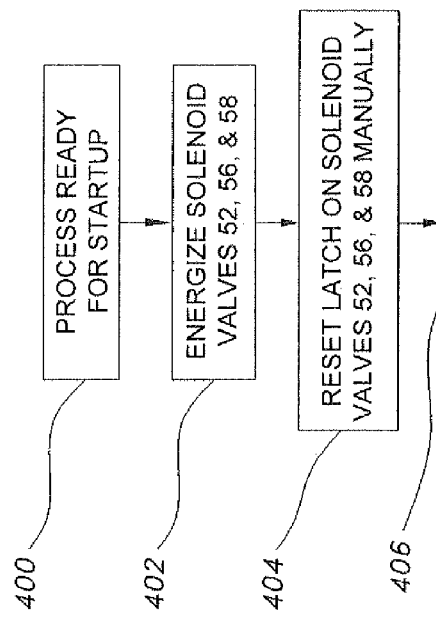
FIG. 4 is a flowchart describing the steps involved in operating various valves in the startup process of the shut-off valve testing system according to the present invention.

FIGS. 3 and 4 are flowcharts that respectively describe the basic steps involved in the emergency shutdown procedure and in the restart procedure. In FIG. 3, a signal indicating some other than nominal aspect of operation is sent to the control system 100 (FIG. 5). The system 100 reacts by sending a shut-down signal to the third hydraulic solenoid valve 52 to close the actuating pressure hydraulic line 28 to the actuator 16 and to open the fourth and fifth hydraulic solenoid valves 56 and 58 to release hydraulic pressure in the actuating pressure side 22 of the actuator 16. Although it is only necessary to open one of the two valves 56 or 58 to shut down the system due to the redundancy of these two valves, the operating system opens both valves to be absolutely certain that hydraulic pressure to the actuating pressure side 22 of the actuator is dumped in the event that one of the two valves 56 or 58 does not function. The regulated pressure through the loading pressure line 26 is of course greater than the essentially zero pressure in the actuating pressure side 22 of the actuator 16. The spring 32 provides further pressure to drive the piston 18 to rapidly close the main shut-off valve 14. The emergency shutdown process ends with the completion of the actuation of the three valves noted above, as indicated by the final step 304 of FIG. 3.

FIG. 4 is a flowchart briefly describing the essential steps in the restart process. Once the system has been determined to be ready to return to normal operation, as indicated by the initial step 400 of FIG. 4, the state or condition of the three hydraulic solenoid valves 52, 56, and 58 is reversed, as indicated by the second step 402 of FIG. 4. However, the valves 52, 56, and 58 may be set to remain in their system shutdown condition until their respective manual latches 52b, 56b, and 58b (FIG. 1) are reset (manually latched) to allow the valves to function normally, as indicated by step 402 of FIG. 4. This manual latch feature requires the operator(s) of the system to verify the proper state or condition of the system prior to restart of the system. Once this has been accomplished, the valves 52, 56, and 58 are returned to their respective states or conditions for normal operation of the system, i.e., valve 52 is reopened and valves 56 and 58 are closed, to assure that the main shut-off valve 14 is open to supply a full delivery of combustive gas to the operation.

It is to be understood that the present invention is not limited to the embodiments described above, but encompasses any and all embodiments within the scope of the following claims.

I claim:

1. A shut-off valve testing system, comprising:
    a hydraulic control cylinder having an actuator volume, a return volume, and a piston therebetween;
    a differential pressure transmitter communicating with the actuator and return volumes of the hydraulic control cylinder;
    a hydraulic actuator selectively communicating hydraulically with the actuator volume of the control cylinder, the hydraulic actuator having a loading pressure volume, an actuating pressure volume, and a piston therebetween, the hydraulic actuator further communicating with and controlling a main shut-off valve;
    a first hydraulic valve disposed between the actuator volume of the control cylinder and the hydraulic actuator;
    a source of hydraulic pressure communicating with the return volume of the control cylinder;
    a second hydraulic valve disposed between the source of hydraulic pressure and the return volume of the control cylinder;

a source of hydraulic pressure communicating with the loading pressure volume and the actuating pressure volume of the hydraulic actuator;

a third hydraulic valve disposed between the source of hydraulic pressure and the actuating pressure volume of the hydraulic actuator;

a hydraulic reservoir communicating with the actuating pressure volume of the hydraulic actuator;

a fourth hydraulic valve disposed between the source of hydraulic pressure and the hydraulic reservoir; and a fifth hydraulic valve disposed between the actuating pressure volume of the hydraulic actuator and the hydraulic reservoir.

2. The shut-off valve testing system according to claim 1, further comprising a computerized control system communicating electronically with the differential pressure transmitter.

3. The shut-off valve testing system according to claim 1, further comprising a main shut-off valve installed in series in a combustible gas delivery line.

4. The shut-off valve testing system according to claim 3, further comprising a closure limit switch, an open limit switch, and a partial travel limit switch disposed between the hydraulic actuator and the shut-off valve.

5. The shut-off valve testing system according to claim 1, wherein the hydraulic valves are electromechanical solenoid valves.

6. The shut-off valve testing system according to claim 1, wherein the second hydraulic valve is a three-way valve.

7. A shut-off valve testing system, comprising:
a hydraulic control cylinder having an actuator volume, a return volume, and a piston therebetween;
a control cylinder condition transmitter disposed with the control cylinder;
a hydraulic actuator selectively communicating hydraulically with the actuator volume of the control cylinder, the hydraulic actuator having a loading pressure volume, an actuating pressure volume, and a piston therebetween, the hydraulic actuator further communicating with and controlling a main shut-off valve;
a computerized control system communicating electronically with the control cylinder condition transmitter;
a first hydraulic valve disposed between the actuator volume of the control cylinder and the hydraulic actuator;
a source of hydraulic pressure communicating with the return volume of the control cylinder;
a second hydraulic valve disposed between the source of hydraulic pressure and the return volume of the control cylinder;
a source of hydraulic pressure communicating with the loading pressure volume and the actuating pressure volume of the hydraulic actuator;
a third hydraulic valve disposed between the source of hydraulic pressure and the actuating pressure volume of the hydraulic actuator;
a hydraulic reservoir communicating with the actuating pressure volume of the hydraulic actuator;
a fourth hydraulic valve disposed between the source of hydraulic pressure and the hydraulic reservoir; and
a fifth hydraulic valve disposed between the actuating pressure volume of the hydraulic actuator and the hydraulic reservoir.

8. The shut-off valve testing system according to claim 7, wherein the control cylinder condition transmitter comprises a differential pressure transmitter communicating with the actuator and return volumes of the control cylinder.

9. The shut-off valve testing system according to claim 7, further comprising a main shut-off valve installed in series in a combustible gas delivery line.

10. The shut-off valve testing system according to claim 9, further comprising a closure limit switch, an open limit switch, and a partial travel limit switch disposed between the hydraulic actuator and the shut-off valve.

11. The shut-off valve testing system according to claim 7, wherein the hydraulic valves are electromechanical solenoid valves.

12. The shut-off valve testing system according to claim 7, wherein the second hydraulic valve is a three-way valve.

13. A shut-off valve testing system, comprising:
a hydraulic control cylinder having an actuator volume, a return volume, and a piston therebetween;
a hydraulic actuator selectively communicating hydraulically with the actuator volume of the control cylinder, the hydraulic actuator having a loading pressure volume, an actuating pressure volume, and a piston therebetween;
a main shut-off valve communicating with the hydraulic actuator, the main shut-off valve being installed in series in a combustible gas delivery line;
a first hydraulic valve disposed between the actuator volume of the control cylinder and the hydraulic actuator;
a source of hydraulic pressure communicating with the return volume of the control cylinder;
a second hydraulic valve disposed between the source of hydraulic pressure and the return volume of the control cylinder;
a source of hydraulic pressure communicating with the loading pressure volume and the actuating pressure volume of the hydraulic actuator;
a third hydraulic valve disposed between the source of hydraulic pressure and the actuating pressure volume of the hydraulic actuator;
a hydraulic reservoir communicating with the actuating pressure volume of the hydraulic actuator;
a fourth hydraulic valve disposed between the source of hydraulic pressure and the hydraulic reservoir; and
a fifth hydraulic valve disposed between the actuating pressure volume of the hydraulic actuator and the hydraulic reservoir.

14. The shut-off valve testing system according to claim 13, further comprising a differential pressure transmitter communicating with the actuator and return volumes of the control cylinder.

15. The shut-off valve testing system according to claim 14, further comprising a computerized control system communicating electronically with the differential pressure transmitter.

16. The shut-off valve testing system according to claim 13, further comprising a closure limit switch, an open limit switch, and a partial travel limit switch disposed between the hydraulic actuator and the shut-off valve.

17. The shut-off valve testing system according to claim 13, wherein:
the hydraulic valves are electromechanical solenoid valves; and
the second hydraulic valve is a three-way valve.

* * * * *